(12) United States Patent
Ghirardi et al.

(10) Patent No.: US 9,494,265 B2
(45) Date of Patent: Nov. 15, 2016

(54) PROFILE CLAMP WITH PRE-POSITIONER

(71) Applicant: NORMA GERMANY GMBH, Maintal (DE)

(72) Inventors: Fabio Ghirardi, Turin (IT); Erkan Kayacik, Kadikoy/Istanbul (TR); Mathias Krauss, Nidderau (DE)

(73) Assignee: NORMA GERMANY GMBH, Maintal (DE)

( * ) Notice: Subject to any disclaimer, the term of this patent is extended or adjusted under 35 U.S.C. 154(b) by 110 days.

(21) Appl. No.: 14/174,312

(22) Filed: Feb. 6, 2014

(65) Prior Publication Data

US 2014/0217728 A1    Aug. 7, 2014

(30) Foreign Application Priority Data

Feb. 7, 2013 (DE) .................... 20 2013 001 224 U (51) Int. Cl.
F16L 23/08 (2006.01)

(52) U.S. Cl.
CPC ..................................... F16L 23/08 (2013.01)

(58) Field of Classification Search
CPC ...... F16L 23/08; F16L 23/003; F16L 23/006
USPC .......................................................... 285/23
See application file for complete search history.

(56) References Cited

U.S. PATENT DOCUMENTS

| | | | | |
|---|---|---|---|---|
| 2,269,664 A * | 1/1942 | Hallerberg | ............ | F16L 23/08 285/367 |
| 3,889,984 A | 6/1975 | Lambiris | | |
| 5,002,094 A * | 3/1991 | Brovont | ............. | F16L 33/08 285/365 |
| 5,415,435 A * | 5/1995 | Colbert | ............. | F16L 3/08 285/23 |
| 5,616,205 A * | 4/1997 | Cogdill | ............. | F16L 33/02 285/23 |
| 5,620,209 A * | 4/1997 | Sauer | ............. | F16L 33/03 285/23 |
| 5,782,499 A * | 7/1998 | Gfrerer | ............. | F16L 23/08 285/23 |
| 5,815,892 A | 10/1998 | Geppert | | |
| 5,915,739 A * | 6/1999 | Cradduck | ............. | F16L 33/03 285/23 |
| 5,967,564 A * | 10/1999 | Gaucherot | ............. | F16L 23/04 285/23 |
| 6,343,772 B1 * | 2/2002 | Oi | ............. | F16L 33/03 285/23 |
| 6,530,609 B1 * | 3/2003 | Chatterton | ............. | F16L 33/03 285/23 |
| 6,942,253 B2 | 9/2005 | Bowater | | |
| 7,458,619 B2 * | 12/2008 | Cassel | ............. | F01N 13/1805 285/23 |
| 7,648,174 B2 | 1/2010 | Tanaka et al. | | |
| 2005/0017510 A1 | 1/2005 | Rigollet et al. | | |
| 2007/0018063 A1 | 1/2007 | Lange et al. | | |

(Continued)

FOREIGN PATENT DOCUMENTS

CN    1599851    3/2005
CN    101251213    8/2008

(Continued)

OTHER PUBLICATIONS

European Search Report conducted in counterpart European Appln. No. 13197636.7 (May 15, 2014) w/ English language translation.

(Continued)

*Primary Examiner* — David E Bochna
(74) *Attorney, Agent, or Firm* — Greenblum & Bernstein, P.L.C.

(57) ABSTRACT

Profile clamp and method of connecting two flanged pipes or lines. The profile clamp includes a clamping band having two flanks; and a pre-positioner having at least one attachment section and being connected to the clamping band. The at least one attachment section runs axially beyond one of the flanks and radially inside the two flanks.

12 Claims, 5 Drawing Sheets

(56) References Cited

U.S. PATENT DOCUMENTS

2008/0185841 A1    8/2008  Ignaczak et al.
2013/0334815 A1*  12/2013  Kayacik .................. F16L 23/08
                                                                                      285/420
2015/0115605 A1*   4/2015  Gramza .................. F16L 21/06
                                                                                      285/410

FOREIGN PATENT DOCUMENTS

| CN | 101631983 | 1/2010 |
|---|---|---|
| CN | 203131259 | 8/2013 |
| DE | 10 2008 047 038 | 3/2010 |
| EP | 1840439 | 10/2007 |
| FR | 2697893 | 5/1994 |
| JP | 10-176703 | 6/1998 |
| JP | 2001-141154 | 5/2001 |

OTHER PUBLICATIONS

Korea Search Report conducted in counterpart Korea Appln. No. 10-2014-0012568 (Nov. 21, 2014) w/ English translation.
China Search Report conducted in counterpart China Appln. No. 201410045116.7 (Jul. 15, 2015) w/ English translation.
China Office Action conducted in counterpart China Appln. No. 201410045116.7 (Feb. 15, 2016) w/ Partial Machine translation.

* cited by examiner

PROFILE CLAMP WITH PRE-POSITIONER

CROSS-REFERENCE TO RELATED APPLICATIONS

The present application claims priority under 35 U.S.C. §119 of German Utility Model Application No. 20 2013 001 224.2, filed Feb. 7, 2013, the disclosure of which is expressly incorporated by reference herein in its entirety.

BACKGROUND OF THE INVENTION

1. Field of the Invention

Embodiments of the invention relate to a profile clamp with a clamping band and a pre-positioner. The clamping band includes two flanks and the pre-positioner is connected to the clamping band and has at least one attachment section.

2. Discussion of Background Information

Profile clamps are normally used to connect two lines that have connection flanges at their ends. Such profile clamps typically surround the two connection flanges on the front faces thereof facing away from one another and thus press the connection flanges against one another. The profile clamp normally has a V-shaped profile for this purpose. During the tightening of these profile clamps, not only a radial force is applied to the flanges, but also an axially directed force which presses the flanges of the lines together. However, positioning or setting these known profile clamps is relatively difficult in many application areas. Particularly in the case of constricted spatial conditions, it can be difficult for the fitter to press the connection flanges together while placing and holding the profile clamp in position and closing it. Moreover, in the application area of automobile engines, it can occur that the position of the desired line connection is only accessible from one side.

From German Patent Application No. DE 10 2008 047 038 A1, a spring band clamp is disclosed with a clamping band and a pre-positioner. Such spring band clamps can be used, e.g., to fix a hose on a connecting piece. The clamping band of spring band clamps therefore also usually has an essentially cylinder-shaped cross section, since the spring band clamp only needs to apply a force directed radially inwards. Further, the pre-positioner now allows the spring band clamp to attach to a hose with the aid of tips of the type of a hook.

However, such a pre-positioner would be unsuitable for a profile clamp for many reasons. On the one hand, prior to fixing a profile clamp, it is necessary to hold the profile clamp in the position of a connection flange spaced far enough radially that the second connection flange can still be guided onto the first connecting flange on the front-face side. In the case of the aforementioned pre-positioner, this is precisely counterproductive for a spring band clamp, since it is desirable to already pre-position the spring band clamp as closely as possible, possibly even positively, to the hose. Furthermore, the noted tips for attaching the spring band clamp to a hose are unsuitable for applications of profile clamps, as a puncturing of the line there could lead to a leak.

SUMMARY OF THE INVENTION

Embodiments of the invention provide a pre-positioner for a profile clamp that facilitates the installation of profile clamps.

According to the embodiments, at least one attachment section runs axially beyond one of the flanks and radially inside the two flanks.

A pre-positioner with an attachment section of the above-noted type allows the profile clamp to be pre-positioned on a first line in the region of a first connecting flange with a sufficiently large radial distance. In this way, the clamping band of the profile clamp does not obstruct a front-face guiding of a second connection flange onto the first connection flange. Thus, the installation of such a profile clamp is simplified considerably and can be performed without a problem by a single fitter. In particular, it is no longer necessary that a fitter holds the profile clamp in position in a sufficiently spread-open state in the region of the first connecting flange in order to be able to introduce the second connecting flange.

Furthermore, it is advantageous if the pre-positioner includes at least one bridge. Such a bridge can then have the form of, e.g., a sheet metal strip and lead from the clamping band axially past the flanks of the clamping band and radially inwards past the flanks of the clamping band up to a radial outside of one of the lines (or pipes). The at least one attachment section can then be arranged, e.g., at the end of the bridge facing away from the clamping band.

Furthermore, it may be advantageous if the pre-positioner has at least one essentially flat connection element. Such an element can allow a simplest possible attachment of the pre-positioner to the clamping band or to a line. The pre-positioner can then be, e.g., connected, in particular welded, to a first line and/or to the clamping band on another connection element, in a materially bonded connection in the region of at least one of these essentially flat connection elements.

It may furthermore be advantageous if the pre-positioner includes at least one support band. Such a support band allows a more reliable pre-positioning of the clamping band to be achieved. Thus, depending upon the arrangement, such a support band can, e.g., apply a spring force to the clamping band or to an end section of a line. A materially bonded connection, e.g., by a welding operation, can thus be omitted in several cases.

It can furthermore be advantageous if at least one attachment section includes a support band. In such an embodiment, it is possible for example that the support band positively surrounds an end section of a first line beyond the first connecting flange. Thus, at least one support band is arranged axially beyond one of the flanks and radially inside the two flanks. Thus, it is ensured that the clamping band can be held spaced radially far enough from the first connecting flange.

It is further preferred that at least one support band is arranged radially outside on the clamping band. In such an embodiment, the profile clamp can be held particularly well in a chosen spread-open position. Here, it is conceivable that the pre-positioner has both a support band axially offset from the clamping band and also a support band arranged radially outside on the clamping band.

It is further preferred that one bridge is arranged respectively at the circumferential ends of at least one support band. In this way, the bridges are connected radially outside to the clamping band. In this embodiment, it is possible to produce, e.g., the pre-positioner from a single curved sheet metal strip.

It is furthermore advantageous that the pre-positioner is materially bonded, in particular welded, to the clamping band in at least one position. Thus, the pre-positioner can be pre-positioned particularly easily in the region of the first connection flange together with the profile clamp.

It may be preferred that the profile clamp has two clamping jaws and the pre-positioner is connected to the clamping band in at least two positions in the region of the clamping jaws. In this embodiment, the profile clamp can also be held under prestress by the pre-positioner. Thus, the profile clamp avoids inadvertently widening radially prior to the final fixing.

It may advantageous be that the pre-positioner holds the profile clamp under radial prestress with a spring force. This can be achieved in several manners. By way of example, the pre-positioner can be connected to the clamping band by at least two circumferentially spaced bridges. Alternatively, the pre-positioner can include a support band arranged radially outside on the clamping band.

It can furthermore be advantageous that the clamping band has at least two segments and the pre-positioner is not engaged with at least one of the segments. In this embodiment, it is possible that the pre-positioner is connected to the clamping band on at least one segment and holds the clamping band in position. Moreover, the profile clamp with at least one free segment can also be opened or closed to the extent that this becomes necessary during installation. This is in particular advantageous during the closing operation, since the free end sections of the profile clamp must be guided together in order to enable, e.g., the tightening of a screw or the setting of a bolt to close the profile clamp. If at least one segment of the clamping band now remains free, this segment can be bent radially inwards in order to facilitate the closing; however, a loosening of the pre-positioning is avoided at the same time. Preferably, the clamping band has four segments and the pre-positioner is engaged with only two of the segments.

Embodiments of the invention are directed to a profile clamp that includes a clamping band having two flanks; and a pre-positioner having at least one attachment section and being connected to the clamping band. The at least one attachment section runs axially beyond one of the flanks and radially inside the two flanks.

According to embodiments of the instant invention, the pre-positioner can include at least one bridge.

In accordance with other embodiments, the pre-positioner can include at least one essentially flat connection element.

In further embodiments, the pre-positioner may include at least one support band. Further, the at least one attachment section can include the at least one support band. The at least one support band may be arranged radially outside of the clamping band. Moreover, a bridge can be arranged at respective circumferential ends of the at least one support band, and the bridges may be connected to the clamping band radially on the outside.

According to embodiments, the pre-positioner can be materially bonded to the clamping band in at least one position. The material bond can be a weld.

In accordance with still other embodiments of the invention, the profile clamp can include two clamping jaws. The pre-positioner may be connected to the clamping band in at least two positions in a region of the clamping jaws.

Moreover, the pre-positioner can be structured and arranged to hold the profile clamp under radial prestress with a spring force.

According to other embodiments, the clamping band can include at least two segments and the pre-positioner is not engaged with at least one of the at least two segments. The clamping band may include at least four segments. Further, a gap can be formed between at least two adjacent segments.

Embodiments of the invention are directed to a method of attaching two pipes or lines having flanges with the profile clamp described above. The method includes coupling the pre-positioner to the clamping band; coupling the pre-positioner to a first one of the two pipes; opening the clamping band and locating the flange of the first pipe between the flanks; and locating the flange of the second pipe between the flanks.

In embodiments, the method can also include closing the clamping band around the flanges.

According to other embodiments, at least one of the pre-positioner/clamping band coupling and the pre-positioner/first pipe coupling may be a welded connection.

Embodiments of the invention are directed to a method of attaching two pipes or lines having flanges. The method include opening a clamping band having two flanks; positioning a first flange of a first of the two pipes between the two flanks; coupling a pre-positioner connected to the clamping band to the first pipe, whereby a radial positioning of the clamping band relative to the first pipe is fixed; positioning a second flange of the second pipe against the first flange and between the two flanks; and tightening the clamping band.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
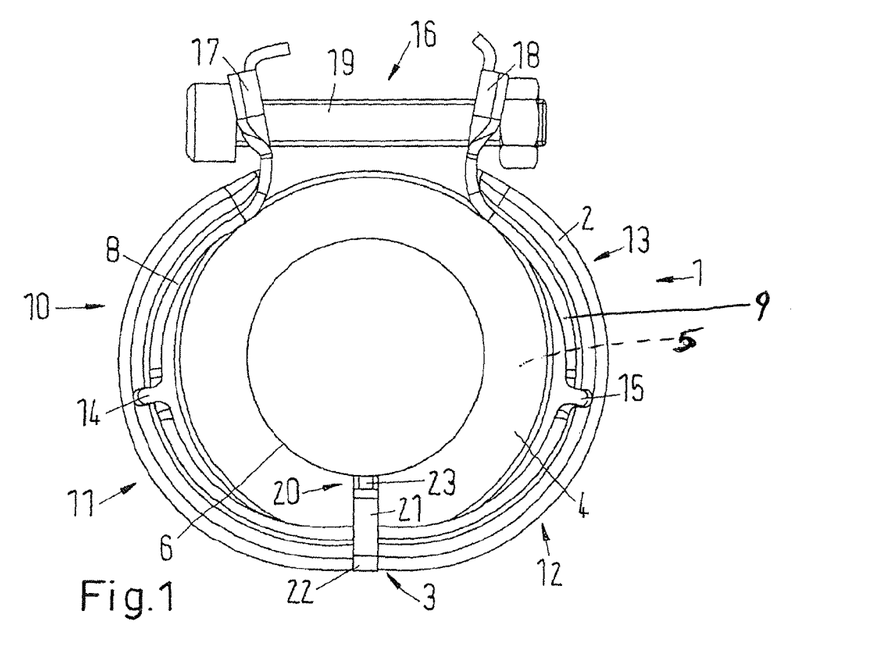
FIG. 1 shows a profile clamp with a pre-positioner in a first embodiment in a front-face view.
Figure 2:
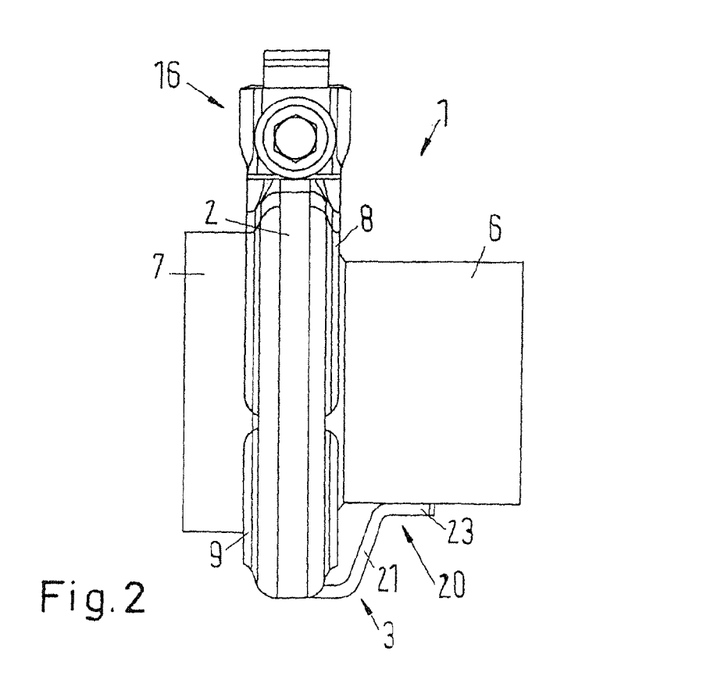
FIG. 2 shows the embodiment according to FIG. 1 in a side view.
Figure 3:
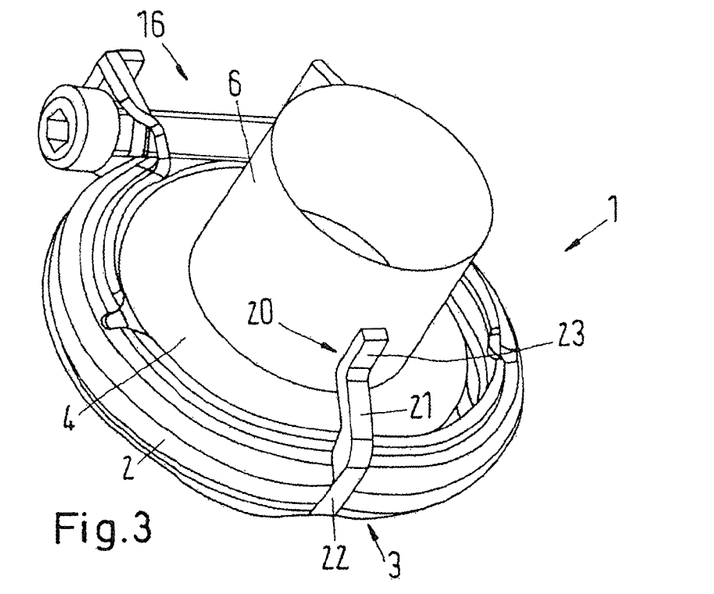
FIG. 3 shows the embodiment according to FIGS. 1 and 2 in a perspective representation.

FIGS. 1-3 show a profile clamp 1 with a clamping band 2 and a pre-positioner 3. The profile clamp 1 in a closed state surrounds respective connection flanges 4, 5 of two lines 6, 7. In the illustration, while only flange 4 of line 6 is shown, it is understood that line 7 includes a flange 5 facing and arranged against flange 4 of line 6.

Clamping band 2 has an essentially V-shaped profile with flanks 8, 9, which, in the closed state of profile clamp 1, axially press together connection flanges 4, 5. In the illustrated embodiment, clamping band 2 has four segments 10, 11, 12 and 13 arranged such that a gap 14 is located between segments 10, 11 and a gap 15 is located between segments 12, 13. Because of these gaps 14, 15, profile clamp 1 has a somewhat higher elasticity so that it can be bent open and closed more easily without individual segments 10, 11, 12, 13 being distorted thereby. Moreover, it is to be readily understood that a further gap can be located between segments 11, 12.

Profile clamp 1 also has a connection geometry 16 having clamping jaws 17, 18 arranged at the circumferential ends of clamping band 2. In this manner, clamping jaws 17, 18 can be moved towards one another using a clamping device 19, e.g., a bolt or screw, in order to close profile clamp 1.

Profile clamp 1 also has a pre-positioner 3 structured and arranged so that profile clamp 1 can be pre-positioned at an end of a first line 6 in the region of first connection flange 4. In the present embodiment, pre-positioner 3 comprises an attachment section 20, which is part of a bridge 21. In this way, pre-positioner 3 is radially connected to clamping band 2 from the outside and, at the same time, bears radially outside against first line 6. Attachment section 20 is arranged radially inside flanks 8, 9 of clamping band 2. Further, this arrangement is applicable when profile clamp 1 is the open state and in the closed state. However, a radial distance between attachment section 20 and flanks 8, 9 can be reduced through the closing operation of profile clamp 1.

For the pre-positioning, pre-positioner 3 is fixed both on profile clamp 1 and on line 6 by the at least one attachment section 20 thereof. However, pre-positioner 3 can also be materially bonded to profile clamp 1 so that only one connection of attachment section 20 to line 6 is necessary for the pre-positioning. By the at least one attachment section 20 being arranged radially inside flanks 8, 9 of clamping band 2, it is now ensured that flanks 8, 9 of clamping band 2 are spaced radially far enough from lines 6, 7 after pre-positioning that respective connection flanges 4, 5 can be guided against one another on their front-face sides without a problem. Here, it is then also no longer necessary that the fitter holds profile clamp 1 in position on first connection flange 4.

Here, pre-positioner 3 has two essentially flat connection elements 22, 23. With the aid of connection elements 22, 23, a materially bonded connection can be easily produced between pre-positioner 3 and clamping band 2 or first line 6. Thus, pre-positioner 3 can be, e.g., welded to clamping band 2 via connection element 22 and/or to first line 6 via connection element 23.

Figure 4:
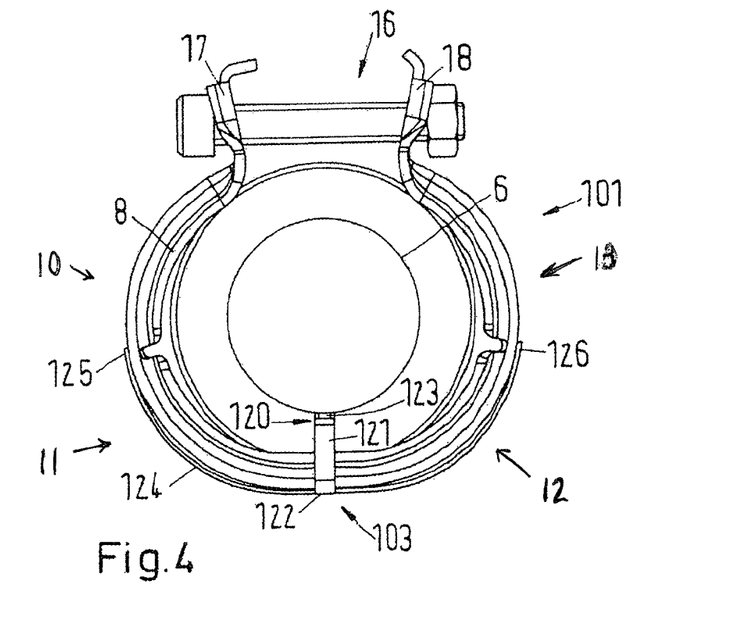
FIG. 4 shows a second embodiment of a profile clamp with a pre-positioner in a front-face view.
Figure 5:
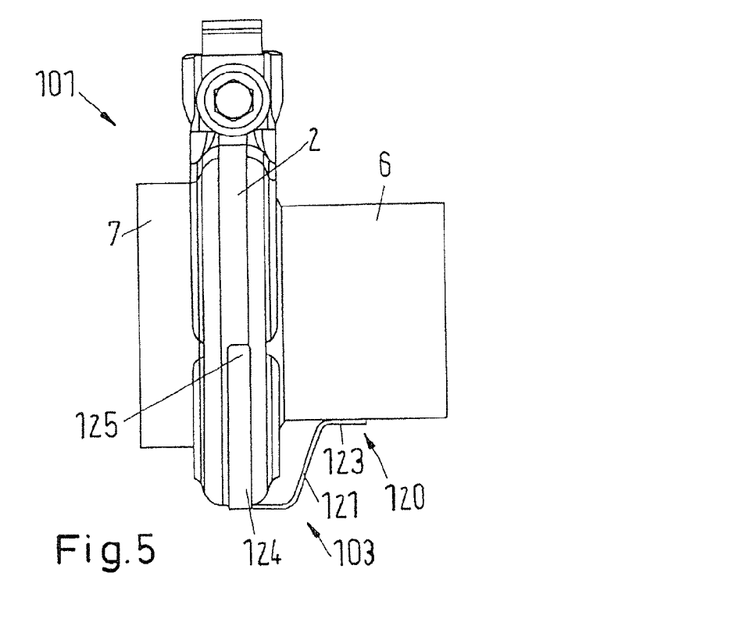
FIG. 5 shows the embodiment according to FIG. 4 in a side view.
Figure 6:
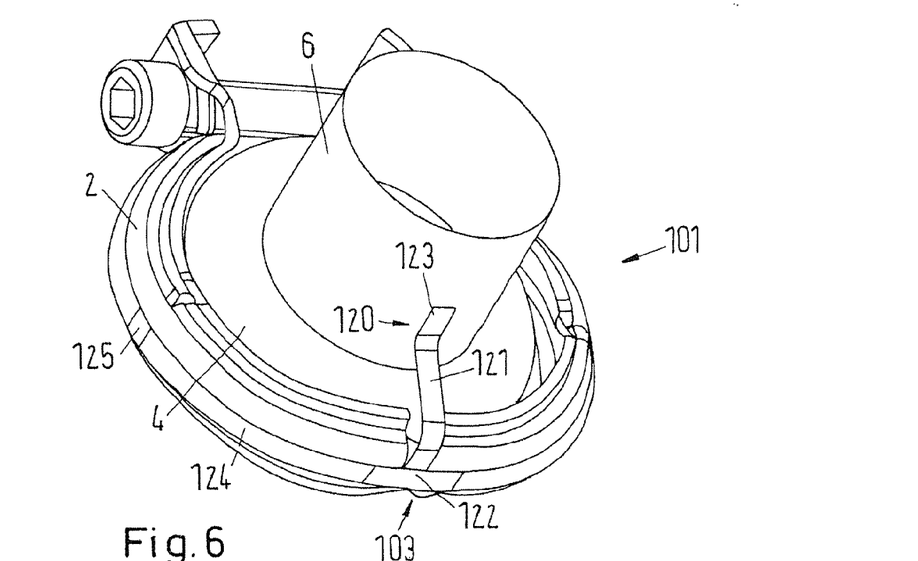
FIG. 6 shows the embodiment according to FIGS. 4 and 5 in a perspective representation.

In FIGS. 4-6, another embodiment of the invention is illustrated. In particular, pre-positioner 103 has an attachment section 120, which includes a bridge 121 and connection elements 122, 123. In addition, pre-positioner 103 also includes a support band 124 which radially surrounds clamping band 2 from the outside. In the illustrated embodiment, support band 124 is arranged radially outside clamping band 2 to circumferentially surround an angular range of approximately 180°. Thus, support band 124 can be arranged to only engage with two segments 11, 12 of profile clamp 110. In this way, segments 10, 13 can still be bent open or closed without the pre-positioning being substantially influenced. Pre-positioner 103 can also be materially bonded to clamping band 2 at circumferential ends 125, 126 of support band 124. In this way, a more reliable pre-positioning of profile clamp 101 results and an inadvertent loosening or tilting of profile clamp 101 can thus be avoided in the pre-positioned position.

Of course, it is to be understood that pre-positioner 3, 103 can include additional attachment sections 20, 120, in event, e.g., a higher stability of pre-positioner 3, 103 is desired.

Figure 7:
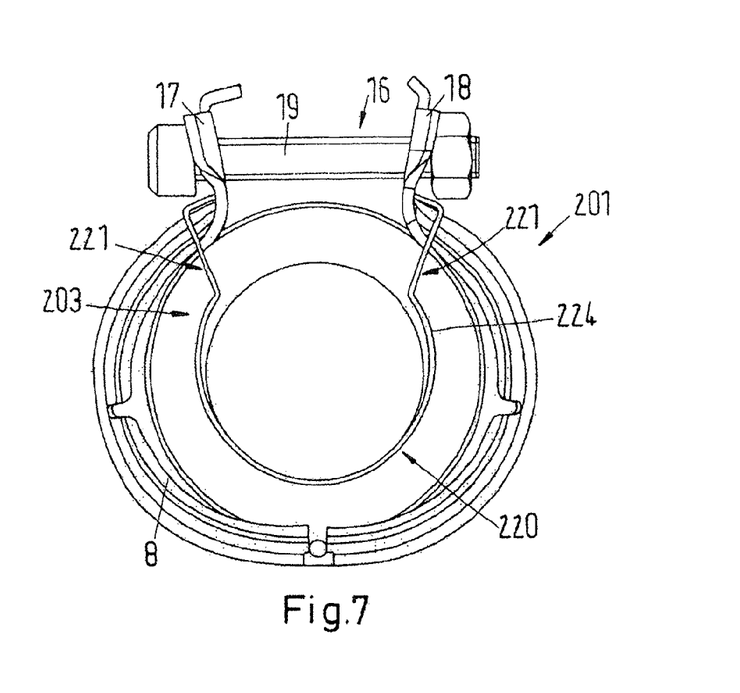
FIG. 7 shows a profile clamp with a pre-positioner according to a third embodiment of the invention in a front-face view with an open profile clamp.
Figure 8:
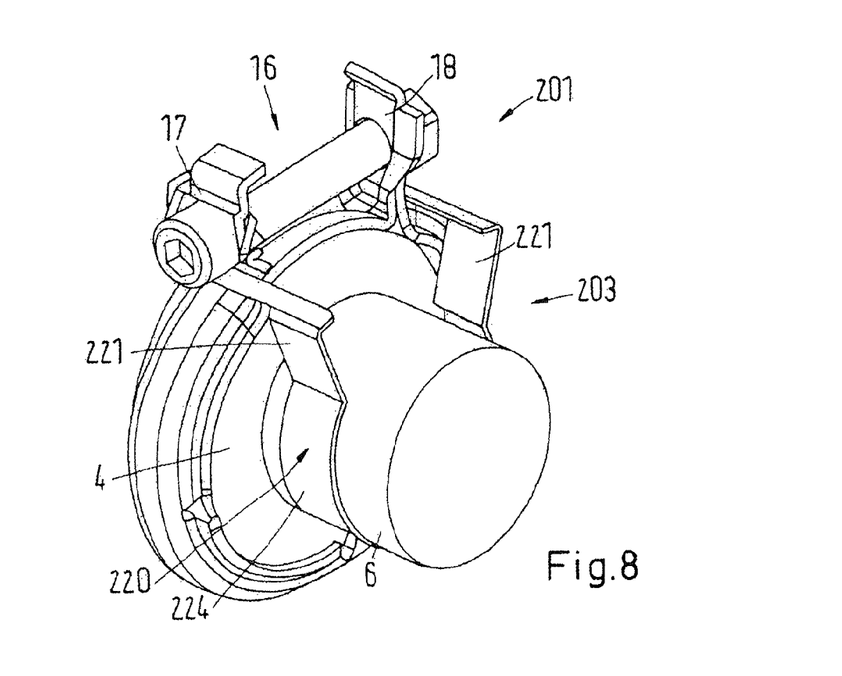
FIG. 8 shows the embodiment according to FIG. 7 in a perspective view.
Figure 9:
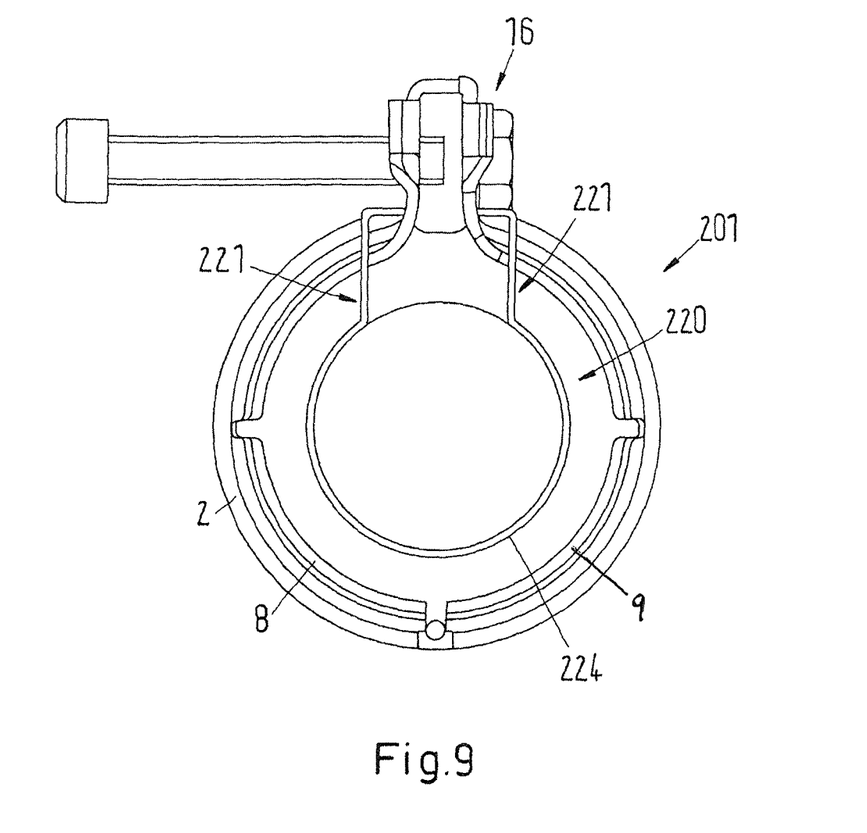
FIG. 9 shows the embodiment according to FIGS. 7 and 8 in a front-face view with a closed profile clamp.

A third embodiment of the invention is illustrated in FIGS. 7-9. In this embodiment, pre-positioner 203 comprises a support band 224 which is arranged axially offset from clamping band 2. Further, support band 224 is arranged radially inside the flanks of clamping band 201. Thus, support band 224 can, at least partially, be positively arranged radially outside on first line 6. Preferably, support band 224 can circumferentially surround first line 6 around more than 180° and can bear against first line 6 under a spring tension directed radially inwards. Here, attachment section 220 can be embodied or formed as essentially being formed by support band 224.

Pre-positioner 203 includes a bridge 221 at each of the circumferential ends of support band 224. Bridges 221 are arranged to run or extend radially outwards from the circumferential ends and axially from clamping band 2. Bridges 221 are connected to, e.g., clamping band 2 radially from the outside. Preferably, bridges 221 are engaged with clamping band 2 radially from the outside in the region of clamping jaws 17, 18. Thus, a pre-closing function can also be achieved via pre-positioner 203. Thus, it is avoided that profile clamp 201 can inadvertently open in the pre-positioned position by more than a certain amount. It can thus be ensured that connection flanges 4 can be guided against one other on the front-face sides without a problem and, at the same time, that profile clamp 201 is positioned in a sufficiently stationary manner. Pre-positioner 203 according to this embodiment has, because of attachment section 220 including a support band 224, the advantage that materially bonded connections between the pre-positioner 203 and first line 6 can be omitted. Thus, profile clamp 201 can also still be angularly or axially displaced in the pre-positioned state. A materially bonded connection between the pre-positioner 203 and the clamping band 2 is also not absolutely necessary in the present embodiment. Therefore, pre-positioner 203 can even be removed and, if necessary, reused following completion of the clamp assembly.

A comparison of FIGS. 7 and 9 also shows that attachment section 220 runs radially inside flanks 8, 9 both with a still-open and with a closed profile clamp 201.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A profile clamp for connection of two lines that have connection flanges at their ends comprising:
   a clamping band having two flanks; and
   a pre-positioner having at least one attachment section and being materially bonded to the clamping band,
   wherein the at least one attachment section runs axially beyond one of the flanks and radially inside the two flanks, the clamping band comprises at least two segments and the pre-positioner is not engaged with at least one of the at least two segments, the pre-positioner comprises at least one support band, and bridges are arranged at respective circumferential ends of the at least one support band,
   wherein the bridges are connected to the clamping band radially on the outside.

2. The profile clamp according to claim 1, wherein the pre-positioner comprises at least one essentially flat connection element.

3. The profile clamp according to claim 1, wherein the at least one attachment section comprises the at least one support band.

4. The profile clamp according to claim 1, wherein the at least one support band is arranged radially inside of the clamping band.

5. The profile clamp according to claim 1, wherein the material bond is a weld.

6. The profile clamp according to claim 1, further comprising two clamping jaws, wherein the pre-positioner is connected to the clamping band in at least two positions in a region of the clamping jaws.

7. The profile clamp according to claim 1, wherein the pre-positioner is structured and arranged to hold the profile clamp under radial prestress with a spring force.

8. The profile clamp according to claim 1, wherein the clamping band comprises at least four segments.

9. The profile clamp according to claim 1, wherein a gap is formed between at least two adjacent segments.

10. A method of attaching two pipes or lines having flanges with the profile clamp according to claim 1, comprising:
    coupling the pre-positioner to the clamping band;
    coupling the pre-positioner to a first one of the two pipes;
    opening the clamping band and locating the flange of the first pipe between the flanks; and
    locating the flange of the second pipe between the flanks.

11. The method according to claim 10, further comprising closing the clamping band around the flanges.

12. The method according to claim 10, wherein at least one of the pre-positioner/clamping band coupling and the pre-positioner/first pipe coupling is a welded connection.

* * * * *